Patented Jan. 1, 1929.

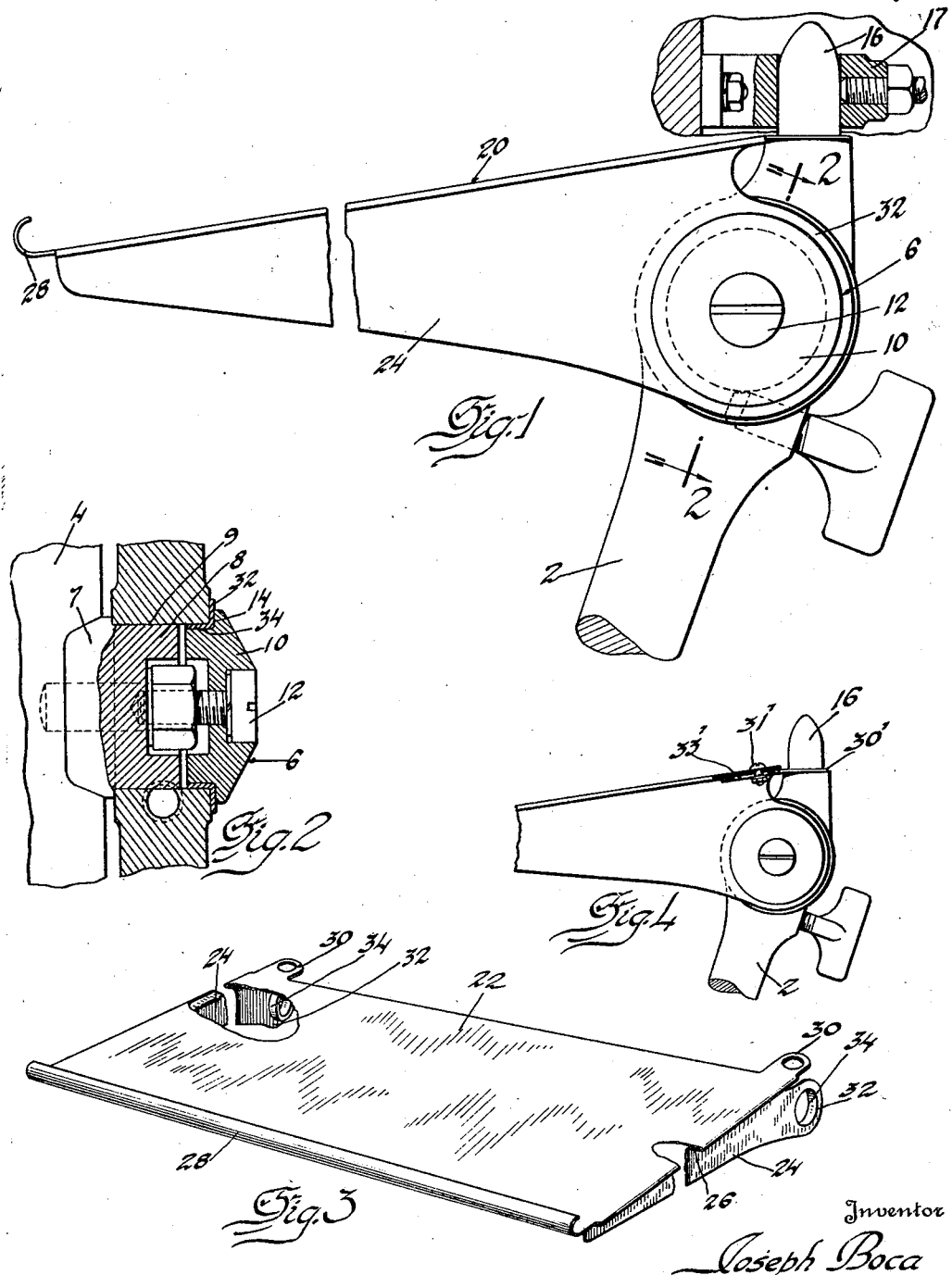

1,697,808

UNITED STATES PATENT OFFICE.

JOSEPH BOCA, OF FLINT, MICHIGAN, ASSIGNOR TO GENERAL MOTORS CORPORATION, OF DETROIT, MICHIGAN, A CORPORATION OF DELAWARE.

VISOR.

Application filed July 6, 1925. Serial No. 41,691.

The object of this invention is to provide an auxiliary shield or visor of very simple construction which may be manufactured at slight cost, preferably from sheet metal. It is a further object of the invention to so form the visor that it may be mounted upon a conventional automobile windshield without the use of fastenings other than those supplied by the windshield parts. Thus I have so designed my visor that it may be held in position by the parts constituting the trunnion serving for the pivotal mounting of one of the windshield sections upon the usual standards. As an additional securing means I also make use of the bow supports provided on the upper portions of these standards and I have furnished my visor with portions engaging over the bow supports and held in place by the top in its normal position.

Referring now to the drawings:

Figure 1 shows an end elevation of my improved visor in assembled position;

Figure 2 is a section on line 2—2 of Figure 1;

Figure 3 is a perspective view of the visor; while

Figure 4 is a fragmentary view corresponding to Figure 1 showing a modification.

The reference character 2 indicates one of the usual standards serving to support the windshield sections, a portion of one of which is shown at 4 in Figure 2. The windshield section is mounted upon the standards by trunnions indicated, generally, by the reference character 6, each of said trunnions having a portion 7 secured to the windshield section and another portion indicated by the reference character 8 journaled in aperture 9 in the standard. Secured to the outer portion of the trunnion member by means of screw bolt 12 is a cap member 10 having an annular shouldered portion 14 and serving to frictionally hold the trunnion member and its associated windshield section in any position of adjustment. Projecting upwardly from the standard 2 is a stud 16 serving to support the usual top bow indicated at 17 in Figure 1.

All the parts so far described form no part of my invention.

I have indicated my improved visor by the reference character 20. This visor is preferably formed of sheet metal and comprises a top portion 22 and end members 24. To secure rigidity I have preferably formed the ends of the top member of double thickness, as shown at 26, accomplishing this by setting the end members 24 inwardly of the ends of the top member. The forwardly projecting side of the top member is preferably upturned as shown at 28 to serve as a trough.

I have provided the top member 22 with perforated ears 30 adapted to engage over the bow supporting members 16, as shown in Figure 1. I have also provided the end members 24 with rearwardly projecting ears 32 which may be provided with in-turned inner edges as shown at 34. These ears are adapted to be received between the cap members 10 and the standards 2 and to be held in position thereby.

It will be apparent that my visor is secured in position by passing the ears 30 over the bow supports 16 whereupon the top bow member may be secured in position and then inserting the in-turned portions 34 of the ears 32 within the apertures 9, first removing the cap members 10 and spreading the end members 24 slightly apart to effect the positioning. By now applying the cap members 10 the ears 32 may be clamped to the standard. It is obvious that while I have provided my visor with ears 30 and also ears 32, the former preventing rotation of the visor when the windshield section is adjusted, yet it is obvious that either securing means may be used without the other if desired.

In the modification shown in Figure 4 the ears 30' are adjustably connected to the visor by means of the fastening means 31' and the slot 33'. This permits a slight swinging adjustment of the visor.

I claim:

1. A windshield visor formed from a single piece of material, including a panel extending across the front of the windshield, integral downturned ears for engagement with the windshield trunnion bearings, and integral rearwardly extending ears adapted for engagement with top attachment bolts.

2. The combination of a standard having a top supporting member projecting therefrom, means for securing a windshield upon the standard, and an auxiliary shield having parts for engagement with both the top supporting member and windshield securing means to support said shield in position.

3. The combination of a pair of spaced standards having studs extending therefrom, a top secured to said studs, a windshield, trunnion bearings in said standards for pivotally mounting the windshield thereto, a visor formed from a single piece of material consisting of a top portion extending across the windshield and downturned side portions, said side portions having attachment with the trunnion bearings and the top portion having attachment with the top securing studs.

4. The combination of a top, supports having a shouldered portion and a stud extending upwardly therefrom to which said top is secured, a windshield, trunnion bearings for pivotally mounting said windshield in said supports, and a visor consisting of a panel portion, downturned ears secured to the supports by means of said windshield trunnion bearings and rearwardly extending ears positioned on said studs between the shouldered portion and top.

5. The combination of a plurality of standards having upwardly projecting top supporting portions, a shield member mounted on said standards for rotary adjustment with respect thereto, said shield member having parts for engagement with said upwardly projecting top supporting portions to hold said member against rotation.

6. The combination of a plurality of spaced standards having trunnion portions for pivotally mounting a part thereto and upwardly projecting portions at their upper extremities for detachably securing a part thereto, a shield member having portions adapted for engagement with said trunnion portions for rotary adjustment of the shield with respect thereto, and other portions adapted for engagement with said upwardly projecting portions to hold the shield against rotation.

7. The combination of a plurality of spaced standards having trunnion portions and upwardly projecting portions, an auxiliary shield member made of resilient material and comprising a top portion and side portions, means associated with said top portion for engagement with said upwardly projecting portions, and means associated with said side portions adapted for seating engagement with said trunnion portions when the side portions are sprung outwardly over said trunnion portions and then released.

8. The combination of a plurality of spaced standards having trunnion portions for pivotally mounting a part thereto, and upwardly projecting portions at their upper extremities for detachably securing a part thereto, a shield member having portions adapted for engagement with said trunnion portions for rotary adjustment with the shield with respect thereto, and other portions adjustably associated with the shield member and adapted for engagement with said upwardly projecting portions for controlling the rotary adjustment of the shield.

In testimony whereof I affix my signature.

JOSEPH BOCA.